(12) United States Patent
Murphy

(10) Patent No.: US 9,945,445 B2
(45) Date of Patent: Apr. 17, 2018

(54) FLYWHEEL

(71) Applicant: Heptron Power Transmission Limited, Merseyside (GB)

(72) Inventor: Gary Murphy, Kirkby (GB)

(73) Assignee: Heptron Power Transmission Limited, Merseyside (GB)

( * ) Notice: Subject to any disclaimer, the term of this patent is extended or adjusted under 35 U.S.C. 154(b) by 421 days.

(21) Appl. No.: 14/646,989

(22) PCT Filed: Nov. 25, 2013

(86) PCT No.: PCT/GB2013/000512
§ 371 (c)(1),
(2) Date: May 22, 2015

(87) PCT Pub. No.: WO2014/080165
PCT Pub. Date: May 30, 2014

(65) Prior Publication Data
US 2015/0300448 A1  Oct. 22, 2015

(30) Foreign Application Priority Data
Nov. 24, 2012 (GB) .................. 1221186.8

(51) Int. Cl.
*H02K 7/09* (2006.01)
*F16F 15/315* (2006.01)
(Continued)

(52) U.S. Cl.
CPC ...... *F16F 15/3156* (2013.01); *F16C 32/0402* (2013.01); *F16C 32/0444* (2013.01);
(Continued)

(58) Field of Classification Search
CPC ................. H02K 7/09; H02K 7/025
(Continued)

(56) References Cited

U.S. PATENT DOCUMENTS 5,314,868 A * 5/1994 Takahata ............. F16C 32/0438
310/10
5,831,362 A * 11/1998 Chu .................... F16C 32/0438
310/90

(Continued)

FOREIGN PATENT DOCUMENTS

FR    2 356 044 A1    1/1978
GB    2 463 534 A     3/2010
(Continued)

OTHER PUBLICATIONS

International Search Report for corresponding patent application No. PCT/GB2013/000512 dated Mar. 21, 2014.

*Primary Examiner* — Thanh Lam
(74) *Attorney, Agent, or Firm* — Renner, Otto, Boisselle & Sklar, LLP

(57) ABSTRACT

A computer controlled support and stabilization unit comprising of a vertical array of magnets for levitating a flywheel containing fluid, a computer controlled adjustable bearing support means that can clamp and unclamp the rotating center shaft of a flywheel containing fluid between a plurality of bearings, a computer controlled adjustable magnetic lifting support means for lifting the flywheel containing fluid to reduce the forces placed on the vertical array of magnets for levitating a flywheel containing fluid and reduce the forces placed on the plurality of bearings clamping the rotating center shaft of a flywheel containing fluid.

11 Claims, 3 Drawing Sheets

(51) Int. Cl.
    *F16F 15/31*     (2006.01)
    *H02K 7/02*     (2006.01)
    *F16C 32/04*     (2006.01)

(52) U.S. Cl.
    CPC ...... *F16C 32/0455* (2013.01); *F16C 32/0474* (2013.01); *F16F 15/31* (2013.01); *F16F 15/315* (2013.01); *H02K 7/02* (2013.01); *H02K 7/025* (2013.01); *Y02E 60/16* (2013.01)

(58) Field of Classification Search
    USPC .................................. 310/90.5, 74, 52–59
    See application file for complete search history.

(56) References Cited

U.S. PATENT DOCUMENTS

| | | | | |
|---|---|---|---|---|
| 5,969,446 | A * | 10/1999 | Eisenhaure | F16F 15/1428 310/51 |
| 5,998,899 | A * | 12/1999 | Rosen | F16C 32/0446 310/112 |
| 6,043,577 | A * | 3/2000 | Bornemann | F16C 32/0438 310/178 |
| 6,624,542 | B1 * | 9/2003 | Gabrys | F16C 32/044 310/52 |

FOREIGN PATENT DOCUMENTS

| | | |
|---|---|---|
| NL | 9 002 415 A | 6/1992 |
| WO | 2012/127194 A2 | 9/2012 |

\* cited by examiner

FLYWHEEL

This application is a national phase of International Application No. PCT/GB2013/000512 filed Nov. 25, 2013 and published in the English language.

FIELD OF THE INVENTION

The invention relates to energy storage systems, more specifically to flywheels.

BACKGROUND TO THE INVENTION

Presently, many efforts are being made to convert and store energy so that electricity can be made available at a time and place when and where it is required.

One method of energy storage presently being developed is a flywheel that uses fluid to increase the mass of the flywheel during its operating cycle.

A problem with this type of flywheel is that, during the operating cycle, the weight of the flywheel will change depending on how much fluid is present within the flywheel.

Because there can be different amounts of fluid within the flywheel at different times, this means that there will be different stresses and strains upon the supporting bearings at different times of the operating cycle.

A flywheel energy storage system may have its operating cycle broken down into three distinct operating periods of time.

There is firstly the period of time when energy is transferred from one form of energy such as, for example, electrical energy into the flywheel to be stored as kinetic energy which can then be seen as the rotation of the flywheel.

Then there is the period of time when energy is not being transferred into the flywheel and not being transferred out of the flywheel other than losses within the system.

Lastly, there is the period of time when energy is being transferred out of the flywheel; this is usually converted into electrical energy for use by the consumer.

During these three periods of the operating cycle different forces, stresses and strains may be set up within flywheel energy storage system. These forces, stresses and strains may be transferred to and from the supporting bearings.

These forces stresses and strains may reduce the operating life of the flywheel energy storage system.

To aid the balance, vibration and overall performance of a flywheel containing fluid there exists a need for a bearing and support mechanism that can adapt very quickly to the constantly changing loads.

STATEMENTS OF INVENTION

The present invention is directed to a flywheel system and control mechanism as defined in the enclosed independent claims. Preferred features are set out in the sub-claims.

It is therefore an object of the present invention to provide a computer controlled support and stabilisation unit comprising of a vertical array of magnets for levitating a flywheel containing fluid.

It is a further object of the present invention to provide a computer controlled adjustable bearing support means that can clamp and unclamp the rotating centre shaft of a flywheel containing fluid between a plurality of bearings.

It is a further object of the present invention to provide a computer controlled adjustable magnetic lifting support means for lifting the flywheel containing fluid and thereby reduce the forces placed on the vertical array of magnets of the present invention and furthermore reduce the forces placed on the plurality of bearings of the present invention.

It is a further object of the present invention to provide a computer control means to coordinate a plurality of control signals to optimise the efficiency of a flywheel containing fluid.

It is a further object of the present invention to provide a computer controlled adjustable magnetic lifting support means for lifting a flywheel containing fluid to reduce the forces acting upon the said computer controlled vertical array of magnetic fields.

It is a further object of the present invention to provide a support and stabilisation means for clamping the rotating shaft of a flywheel containing fluid between two or more mechanical bearings such as for example thrust bearings in order to reduce vibration and instability.

It is a further object of the present invention is to provide a plurality of transducers at different positions within the present invention and thereby provide feedback signals to the computer control means to so that the computer can calculate the present or changing state of all components within the present invention.

It is a further object of the present invention to provide a computer control means for the coordinated control and adjustment of all adjustable components within the present invention.

In this way the computer controlled magnetic bearings and adjustable bearing supports means may be used to compensate for the changes in forces within the system at different times of the operating cycle of a flywheel containing fluid.

The present invention relates to an array of vertical magnets and an adjustable bearing support mechanism that may be used to support a flywheel, more specifically an array of magnets and an adjustable bearing support mechanism that may be used to support a flywheel that contains fluid.

The strength of the magnetic fields may be controlled and adjusted by a computer control system to compensate for the changes in weight and vibration as the fluid moves in and out and around the interior of the flywheel.

The number and strength of the magnets may be determined to support up to or above the maximum possible weight of a flywheel containing fluid, based on a flywheel that is full of fluid to its operational limit. In the event of a flywheel being overfilled with fluid, which may happen due to a component failure within the overall system, the magnetic bearings may not be sufficiently strong enough to support the excess weight unless the system is able to cope with the maximum projected loads. Therefore, it may be designed to support above the maximum weight of the filled-flywheel.

During the operating cycle of a flywheel contain fluid there may be periods of time when instabilities or vibrations may occur due to for example to changes in weight or speed, these changes may happen when fluid enters, exits and moves around within such a flywheel.

One aspect of the present invention is that the adjustable bearing support means of the present invention may be used to clamp the rotating centre shaft of the flywheel between two or more bearings and thereby reduce instabilities.

Another aspect of the present invention is that the adjustable bearing support means adjusted by the computer control means may be used to unclamp the rotating centre shaft of the flywheel when instabilities are within predetermined parameters.

A further aspect of the present invention is an adjustable top magnetic lifting means for increased support of a flywheel that may contain fluid. The top magnetic lifting means may be situated at the top of the rotating centre shaft but only connected to the rotating centre shaft by way of a magnetic field, with a computer controlled adjustment of the said top magnetic lifting means, the magnetic fields may be used to lift the flywheel and thereby reduce the weight pressing down on other components supporting the flywheel such as for example the vertical array of magnetic fields.

Within the present invention there is further provided a containment vessel, in which one or more flywheels may be positioned, either in series or in parallel. The containment vessel may be double-skinned in order to reduce the risk of debris should the device fail and/or parts fracture off. The containment vessel may also be at least partially evacuated to reduce the air resistance, or frictional losses, experienced by the flywheel(s) within the vessel.

The containment vessel of the present invention may contain a one or more flywheels.

In one embodiment of the present invention the flywheel of the present invention may be of a substantially solid construction.

In another embodiment of the present invention the flywheel of the present invention may be constructed with a substantially hollow interior which may contain a plurality of supports and baffles. The interior of the said flywheel may be controllably supplied with fluid to increase the mass of the flywheel.

The amount of fluid supplied to the flywheel of the present invention may be controlled by the computer control means of the present invention.

Within the container of the present invention there may further be provided a flywheel having a cavity for housing fluid, fluid may be supplied to the said cavity in a controlled process, and the said controlled process may be controlled by the computer control circuit of the present invention.

Within the container of the present invention there may further be provided a stationary centre shaft, the said stationary centre shaft may be situated at the central axis of rotation of the flywheel of the present invention.

Within the container of the present invention there may further be provided a plurality of stationary centre shaft fixing means. The said fixing means may secure the stationary centre shaft to the containment vessel of the present invention at both ends of the stationary centre shaft.

Within the containment vessel of the present invention there may further be provided a rotating centre shaft, the said rotating centre shaft may be securely attached to the flywheel of the present invention.

Within the present invention there is further provided, a substantially vertical array of permanent magnets contained within the stationary centre shaft Within the present invention there may be further provided, a substantially vertical array of electromagnets contained within the stationary centre shaft In one embodiment of the present invention, the vertical array of magnetic cores within the stationary centre shaft may be made from a supper conducting material with a flow of cooling fluid to aid the superconductivity of the material.

A further aspect of the present invention is a cooling system to supply cooling fluid to the supper conducting magnetic cores. The said cooling system may be situated externally of the containment vessel of the present invention. In another embodiment of the present invention the said cooling system may be situated within the containment vessel of the present invention.

Within the present invention there is further provided, a substantially vertical array of magnets contained within the rotating centre shaft.

In one embodiment of the present invention each magnet of the said vertical array of magnets may be a magnet of a single circular construction, furthermore each magnet of the said vertical array of magnets may itself be a circular array of individual magnets, In another embodiment of the present invention each magnetic field produced by the said vertical array of magnets may itself be produced by a circular array of individual magnets.

Within the present invention there is further provided, a vertical array of electromagnets contained within the rotating centre shaft.

Within the present invention there is further provided, an inductive coil for supplying power to a vertical array of magnets contained within the rotating centre shaft.

Within the present invention there is further provided, one or more adjustable and controllable, bearing support means.

The bearing support means of the present invention may comprise of a bearing support plate for holding in place a part or parts of a bearing.

The bearing support means of the present invention may further comprise of one or more guide rails to aid with the correct alignment of the adjustable support plate as its position is adjusted.

The bearing support means of the present invention may further comprise of a shock absorber to prevent the bearing parts from being damaging as and when the two parts of the bearing are adjusted and thereby connected together.

The bearing support means of the present invention may further comprise of transducer to provide the computer control circuit with a signal to determine the position of the bearing support plate.

The bearing support means of the present invention may further comprise of an adjustment means for moving the bearing support plate into the correct position as and when determined by the computer control circuit.

The bearing support means of the present invention may further comprise of a part or parts of a bearing, that when adjustment is made to the bearing support means, the said part or parts of the bearing becomes detached from another part or parts of the same bearing.

The adjustable top magnetic support means of the present invention may further comprise of a support plate for holding a magnet. In one embodiment of the present invention the said magnet may be a permanent magnet. In another embodiment of the present invention the said magnet may be an electromagnet.

The adjustable top magnetic support means of the present invention may further comprise of one or more guide rails to aid with the correct alignment of the adjustable magnetic lifting support means as its position is adjusted.

The adjustable top magnetic support means of the present invention may further comprise of a transducer to provide the computer control circuit with a signal to determine the position of the magnetic support means.

The adjustable top magnetic support means of the present invention may further comprise of an adjustment means for moving the magnetic support plate into the correct position as and when determined by the computer control circuit.

The adjustable top magnetic support means of the present invention may further comprise of a second magnet, the said second magnet may be rigidly attached to the rotating centre shaft of the present invention. For clarity the said rotating centre shaft may be rigidly attached to the flywheel containing fluid.

Within the present invention there is further provided a computer control circuit comprising of a power supply for providing the electrical power necessary to enable the electrical components of the said computer control circuit to function in a correct manner.

The computer control circuit of the present invention may further comprise of a computer containing all of the electrical components necessary for a computer to run a program and thereby process input and output signals.

The computer control circuit of the present invention may further comprise of computer program containing the program necessary to process the input and output signals provided by a plurality of transducers which may provide feedback signals to the computer from devices within the present invention.

The computer control circuit of the present invention may further comprise of a plurality of transducers situated at various positions within the housing of the present invention.

The plurality of transducers within the present invention may supply signals back to the computer control circuit to enable the program to process and calculate the correct output signals at the correct time in relation to predetermined parameters.

The computer control circuit of the present invention may further comprise of output signals which may be amplified by a plurality of amplifiers, the said output signals may be used to operate electromechanical devices within the housing of the present invention.

The computer control circuit of the present invention may further comprise of data transmission circuit to enable signals to be transmitted signals to a remote signal processing circuit which may not be within the housing of the present invention.

In one embodiment of the present invention the said data signals may be transmitted by electrical signals using a wired connection.

In another embodiment of the present invention the said data signals may be transmitted to a remote device using a wireless system such as for example radio waves, Bluetooth or Wi-Fi.

There is provided an electrical control circuit incorporating a computer control means. Within the electrical control circuit there is provided, a plurality of transducers, there is further provided a computer control means, and there is further provided a plurality of power output circuits.

The computer control means may process signals received from a plurality of transducers which are situated at various positions within the containment vessel of the present invention.

These transducers may measure, for example, speed of rotation of the flywheel, fluid flow, vibration, weight and/or movement of the flywheel containing fluid.

Using the data from the transducers the computer control means may make adjustments to the magnetic fields supporting the flywheel and, if necessary, make adjustments to the bearing support means.

Generally, but not exclusively, small changes in forces within the flywheel supporting mechanism may be compensated for by the computer control means changing the strength of the magnetic fields supporting the flywheel.

Generally, but not exclusively, larger changes in forces within the flywheel supporting mechanism may be compensated for by the computer control means changing the position of the bearing support means so that the rotating centre shaft may be clamped between two or more fixed bearings such as for example thrust bearings.

To do this the electrical control circuit may incorporate a microprocessor for the computational analysis of data received from the said transducers. The computer control means may use a computer program to analyse the data from the said transducers and depending upon the results of the computation, the electrical control circuit may then provide output signals to operate a plurality of electromagnets and further provide output signals to operate one or more bearing support mechanisms.

To maintain the optimum performance the transducers providing the feedback to the computer control means may detect any changes in the movement of the flywheel containing fluid, the computer control means may analyse any changes in the movement of the flywheel containing fluid and a further change in the output signals may then be applied, this may be done continually throughout the operating cycle. This real-time monitoring and adjustment of the device allow for the potential losses in the system to be reduced.

The power supplied to the plurality of electromagnets may be adjusted by the computer control means depending upon the signals received by the electrical control circuit from the transducers situated within the flywheel housing.

The computer control means and the electrical circuit may be used to constantly monitor and change the power supplied to the vertical array of electromagnets within the present invention, furthermore the computer program and the electrical control circuit may be used to constantly monitor and change the position of the bearing support mechanism, furthermore the computer program and the electrical control circuit may be used to constantly monitor and change the position of the adjustable magnetic lifting support means, furthermore all adjustments within the present invention may be controlled almost simultaneously by the computer control means.

Furthermore depending upon the signals received by the computer control means from the plurality of transducers situated within the housing of the present invention, the position of the bearing support means may be adjusted by electrical signals from the computer control means, thereby providing a constant means of adjustment for the bearing support means, supporting the central rotating drive shaft of the flywheel containing fluid.

In this way the support for the positioning of the flywheel will constantly adapt to the changing conditions of the flywheel as the fluid moves in and out and around the flywheel system in real-time. In this way the optimum support for the positioning of the flywheel containing fluid be achieved, adjusted and maintained electronically.

The electrical circuit may also provide output signals beyond the flywheel container for measurement, adjustment and maintenance of the flywheel containing fluid, the said output signals may be hard wired or wireless signals may be transmitted from the electrical circuit to a distance beyond the operating flywheel container where the signals can be fed into a remote computer for analysis.

BRIEF DESCRIPTION OF THE DRAWINGS

For a better understanding of the present invention and to show more clearly how it may be carried into effect, the present invention will now be described further with reference made by way of example only, to the accompanying drawings, in which.

Figure 1:
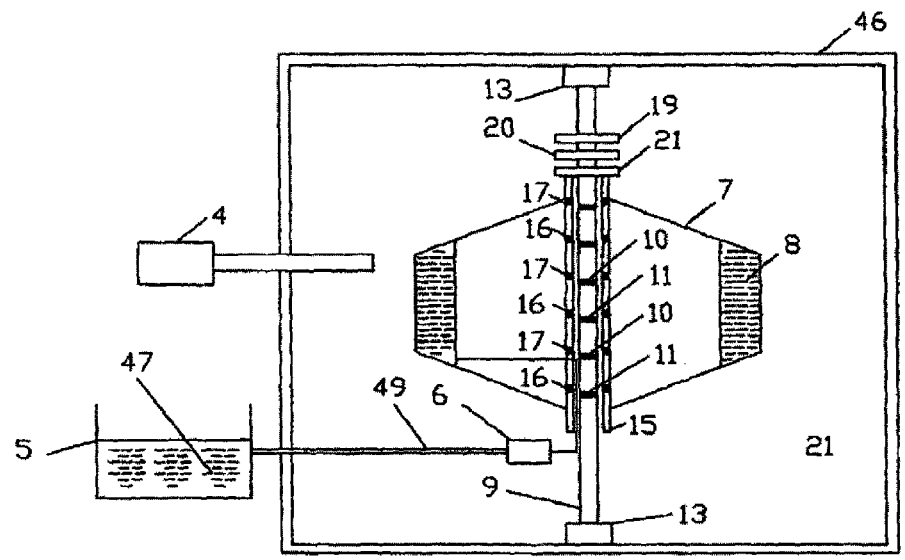
FIG. 1, shows a flywheel containing fluid in accordance with the present invention.

The Figures, show how there is provided a containment vessel 46, for housing, one or more flywheels 7. The said containment vessel 46, may be attached to a vacuum pump 4. The flywheel 7, may be provided with a cavity 8, for retaining fluid 47, the said flywheel 7, may be physically connected to a central rotating shaft 15. The rotating centre shaft 15, may be connected to a stationary centre shaft 9, by one or more magnetic fields 44. The rotating centre shaft 15, may rotate about the stationary centre shaft 9. The rotating centre shaft 15, and the stationary centre shaft 9, may both be positioned about a common central axis of rotation 48.

The stationary central shaft 9, may contain one or more permanent magnets 10, furthermore the central stationary shaft 9, may also contain one or more electromagnets 11. The electromagnets 11 may be vertically stacked, that is, positioned on top of one another coaxially to form a vertical array. The central stationary shaft 9, may be secured into a fixed position of the flywheel containment vessel 46, by a central stationary shaft fixing means 13. The rotating centre shaft 15, may contain a vertical array of magnetic cores 16. In one embodiment of the present invention the magnetic cores 16, may be constructed from a single magnet substantially toroidal, or circular, in shape. In another embodiment of the present invention the magnetic cores 16, may be constructed from a toroidal/circular array of individual magnetic cores situated about the central axis of rotation 48.

The close proximity of the magnets within the stationary centre shaft and the magnets within the rotating centre shaft creates magnetic fields 44.

Within the present invention there is further provided a reservoir 5. In one embodiment of the present invention the reservoir 5, may be situated within the containment vessel 46. In another embodiment of the present invention the reservoir 5, may be situated externally of the containment vessel 46.

Within the present invention there is further provided a fluid control valve 6.

In one embodiment of the present invention the fluid control valve 6, may be situated within the containment vessel 46. In another embodiment of the present invention the fluid control valve 6, may be situated externally of the containment vessel 46.

Within the present invention there is further provided a connection pipe 49, for supplying fluid from the reservoir 5, to the control valve 6.

Within the present invention there is further provided a connection pipe 50, for transferring fluid from the control valve 6, to the flywheel 7.

The central rotating shaft 15, may be connected to a motor 19, or generator 20, or a motor 19 and generator 20, furthermore the flywheel 7, may be connected to a turbine 21.

Within the present invention there is further provided a generator 20, for converting the kinetic energy into electrical energy.

Within the present invention there is further provided a motor 19, for converting electrical energy into kinetic energy.

Within the present invention there is further provided a Turbine 21, the turbine may be used to convert pneumatic pressure or hydraulic pressure from a remote source in to kinetic energy by driving the rotating centre shaft 15, of the flywheel 7. The turbine 21, may also be used for converting the kinetic energy of the flywheel 7, of the present invention back into pressurised fluid flow for driving an electrical generator 51, which may be situated remotely from the turbine 21. The turbine 21, may be pneumatic or hydraulic or a pneumatic and hydraulic turbine.

Where a plurality of flywheels 7 are present, the turbines and/or generators may be linked to one another. This may provide a more efficient system.

It is an object of the present invention to support a flywheel 7, which may contain fluid by means of a plurality of magnetic fields 44.

It is a further object of the present invention to adjust the strength of the said magnetic field 44, depending upon the amount of support needed by the flywheel 7, at any particular instant in time to maintain an optimum position necessary to store kinetic energy for as long as possible within the flywheel 7, of the present invention.

In another embodiment of the present invention the magnetic fields 44, which may be used to levitate and support the flywheel 7, may be created between the substantially vertically aligned array of magnets 10, within the stationary centre shaft 9, and the vertical array of magnets 16, within the rotating centre shaft 15.

In another embodiment of the present invention the magnetic fields 44, which may be used to levitate and support the flywheel 7, may be created between the substantially vertically aligned array of magnets 11, within the stationary centre shaft 9, and the vertical array of magnets 16, within the rotating centre shaft 15.

In another embodiment of the present invention the magnetic fields 44, which may be used to levitate and support the flywheel 7, may be created between a combination of magnets with the stationary centre shaft 9 and the rotating centre shaft 15. Within the combination of magnets there may be a vertical array of magnets 10, a vertical array of magnets 11, a vertical array of magnets 16, and a vertical array of magnets 17.

The strength of the magnetic field 44, may be adjusted by adjusting the power supplied to the electromagnets 17, or the power supplied to the electromagnets 11. The amount of power supplied to the electromagnets 17, or the power supplied to the electromagnets 11, may be controlled by the computer control means 1.

A vertical array of electromagnets 11, may have power supplied to them by means of inductive coils 12, within the rotating centre shaft 15, power may be induced into the inductive coil 12, by way of a magnetic inductor 45, which may be positioned within the stationary centre shaft 9. Power may be supplied to the magnetic indictor 45, to increase or decrease the strength of the magnetic inductance. The amount of power supplied to the magnetic inductor 45, may be controlled by the computer control means 1.

Figure 2:
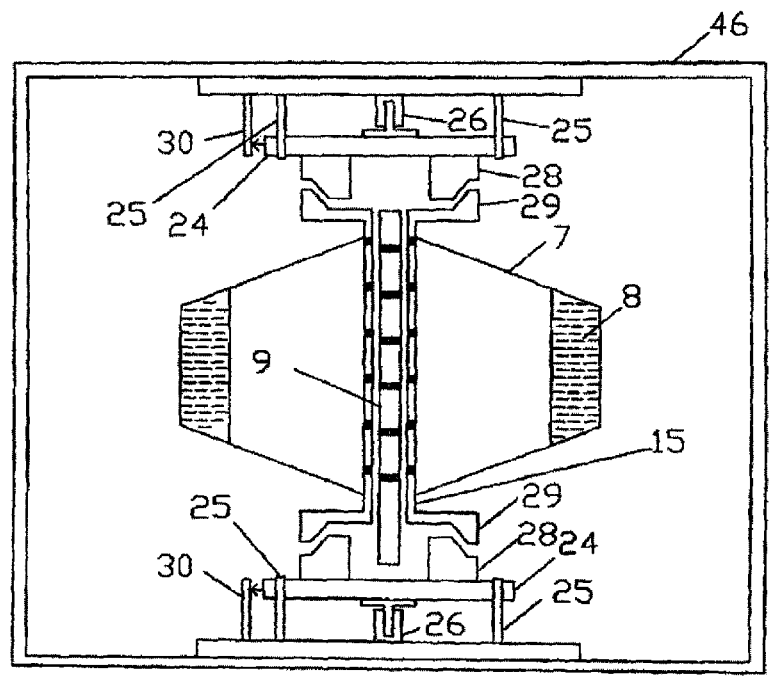
FIG. 2, shows a flywheel containing fluid supported by an adjustable bearing support means in accordance with the present invention.

FIG. 2 shows how within the present invention there is provided an adjustable bearing support means 22, which may be attached at both ends of the rotating centre shaft 15.

Within each adjustable bearing support means 22, of the present invention there is further provided:
a bearing 27, which may be split into two parts, part 28, one of which may be rigidly attached to the supporting plate 24. The other part 29, of the said bearing 27, may be rigidly attached to the rotating centre shaft 15.

The support plate 24, may be attached to a bearing adjustment means 26. The support plate 24, may be supported by one or more guide rails 25.

The support plate 24, may have its position adjusted by the bearing adjustment means 26, the position and movement of the bearing adjustment means 26, may be controlled by the computer control means 1, of the present invention.

A transducer 30, may be used to provide a signal back to the computer control means 1, to enable the computer to analyse and calculate any further movement necessary of the bearing adjustment means 26, after taking into account signals received from other transducers within the present invention.

It can been seen from FIG. 2 that the top and bottom adjustable bearing support means 22, are similar in construction but may be adjusted independently by the computer control means 1.

If after processing signals received from a plurality of transducers within the present invention, it is calculated by the computer control means 1, that the flywheel 7, is vibrating beyond predetermined parameters, the bearing adjustment means 26, may be moved into a position that enables the two parts, part 28, and part 29, of the bearing 27, to be connected together in a controlled movement.

Furthermore if it is calculated by the computer control means 1, that the flywheel 7, of the present invention is unstable or is vibrating beyond predetermined parameters the bearing support means 26, at the top of the rotating centre shaft 15, and the bearing support means 26, at the bottom of the rotating centre shaft 15, may both be adjusted into a position to thereby clamp one or more of the bearings 27, attached to the rotating centre shaft 15, and in this way any vibration of the flywheel 7, may be reduced and stability increased.

If after processing signals received from a plurality of transducers within the present invention it is calculated by the computer control means 1, that the flywheel 7, of the present invention is working within predetermined parameters then signals from the computer control means 1, may be used to adjust the bearing support means 26, and thereby move to separate the two parts, part 28, and part 29, of the bearing 27, furthermore this adjustment may be made to the bearing support means 26, at the top of the rotating centre shaft 15, and the bearing support means 26, at the bottom of the rotating centre shaft 15.

The top adjustable bearing support means 26, or the bottom bearing support means 26, or both bearing support means at the top and bottom may be adjusted into a position to where they thereby unclamp the rotating centre shaft 15, and the flywheel 7, may then rotate freely, levitating on the magnetic bearing 44, of the present invention.

The bearings 27, may provide stability to the flywheel 7, at times of excessive vibration but the frictional losses of the bearings 27, will reduce the speed of the flywheel by a small amount and thereby use valuable power.

It is therefore an object of the present invention to conserve power by allowing the flywheel 7, to rotate freely supported only by the magnetic fields 44, and the adjustable magnetic lifting support means 31.

The computer control means 1, may be programmed to move the adjustable bearing support means 26, when the flywheel 7, is within predetermined parameters and thereby release the bearings 27, from clamping the rotating centre shaft 15, in this way it will be possible to conserve valuable power. To increase efficiency and to prolong the energy storage period of time 56, the computer control means 1, may be programmed to optimise the energy storage process of the present invention by unclamping the rotational centre shaft 15, from the bearings 27, according to programmed parameters.

Figure 3:
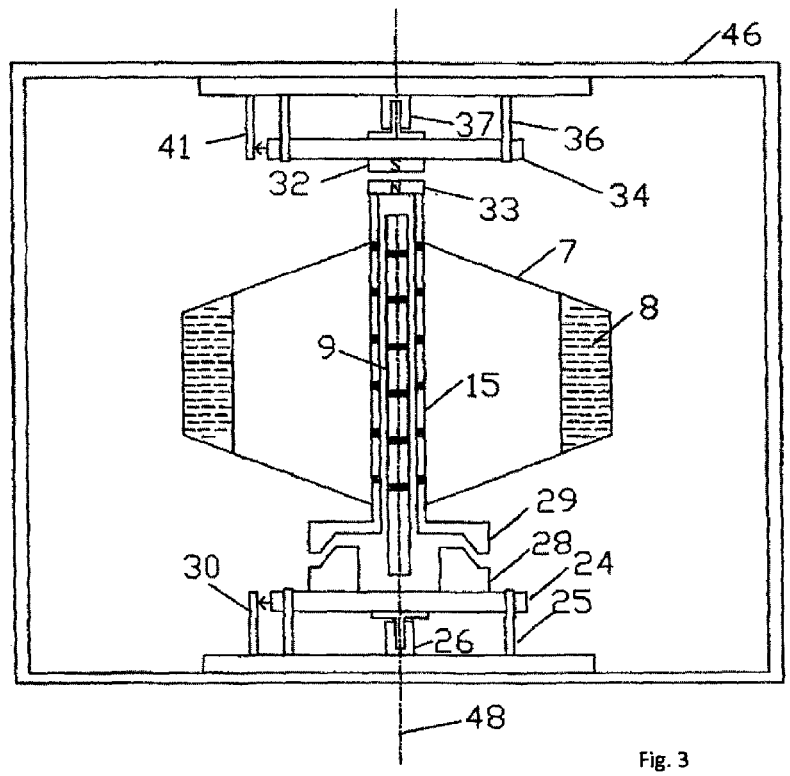
FIG. 3, shows the weight of a flywheel containing fluid resting on one or more bearings being reduced by an adjustable magnetic lifting support means in accordance with the present invention.
Figure 4:
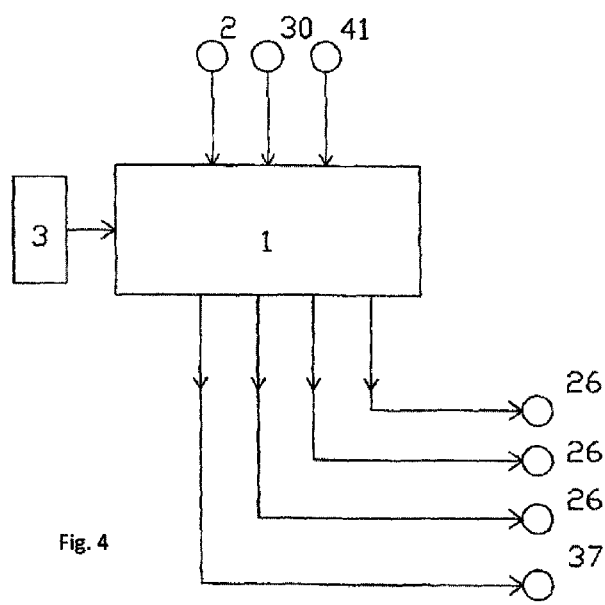
FIG. 4, shows a computer control means connected to process input and output signals within the present invention.

FIG. 3 shows, how the force of a flywheel pushing down on to a bearing or bearings may be reduced by an adjustable magnetic lifting support means 31.

The containment vessel 46, may house, one or more flywheels 7. The said flywheel 7, may be provided with a cavity 8, for retaining fluid 47, the said flywheel 7, may be physically connected to a central rotating shaft 15. The rotating centre shaft 15, may rotate about a stationary centre shaft 9. The rotating centre shaft 15, and the stationary centre shaft 9, may both be positioned about a common central axis of rotation 48.

The rotating centre shaft 15, may be rigidly attached to a magnetic core 33.

The adjustable magnetic lifting support means 31, of the present invention may be housed within a containment vessel 46.

Within the adjustable magnetic lifting support means 31, of the present invention there is further provided; a magnet 32. The said magnet 32, may be attached to a support plate 35, the said support plate 35, may be attached to an adjustment means 37, the support plate 35, may be further supported by one or more guide rails 36.

The support plate 35, may have its position adjusted by the adjustment means 37, the position and movement of the adjustable magnetic lifting support means 31, may be controlled by the computer control means 1, of the present invention.

The energy used by the magnetic fields 44, may be a considerable amount if the energy storage period 53, is prolonged. Furthermore the amount of energy used by the magnetic fields 44, will depend on a number of factors one of which may be the weight of the flywheel 7. For example if the flywheel 7, contains a substantial amount of fluid 47, within the cavities 8, then the weight pushing down on the magnetic fields 44, may require more power to maintain the required lift and levitation.

To help reduce the power consumed by the magnetic fields 44, there is provided an adjustable magnetic lifting support means 31.

A plurality of transducers within the containment vessel 46, of the present invention may provide signals to the computer control means 1, to enable the computer control means 1, to calculate the position of all moving parts within the present invention. After the computer control means 1, has performed these calculations signals may then be used to adjust the adjustable magnetic lifting support means 31.

The computer control means 1, of the present invention may supply signals to the adjustable magnetic lifting support means 31, so that a controlled and constant adjustment of the position of the said adjustable magnetic lifting support means 31, may be made in order to maintain the optimum performance of the flywheel energy storage system.

The position of the adjustable magnetic lifting support means 31 may be adjusted so that the magnet 32, will attract and lift the magnet 33, because the magnet 33, is attached to the rotating centre shaft 15, the flywheel 7, will therefore be attracted upwards and the force pressing down on the magnetic fields 44 will be reduced.

Therefore, to maintain the optimum efficiency of the flywheel energy storage system, the position of the adjustable magnetic lifting support means 31, may be constantly adjusted as the amount of fluid within the flywheel 7, is changing.

Figure 5:
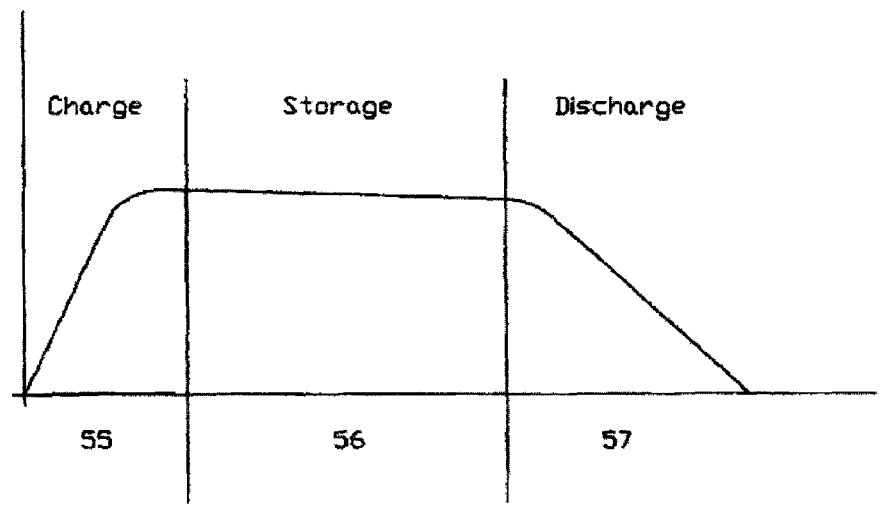
FIG. 5, shows the three stages of the operating cycle of an energy storage system comprising of a flywheel containing fluid in accordance with the present invention.

FIG. 5, shows how the operating cycle of a flywheel energy storage system may be broken in to three distinct periods of time.

The first period of time 55, may be the time when energy is transferred into the energy storage device from an external means.

The second period of time 56 may be the time when energy is not being transferred into the energy storage device and energy is not being transferred out of the energy storage device. This is the period of time when most energy is being stored.

The third period of time 57 is the time when the stored energy is being transferred out of the energy storage device.

An object of the present invention is to reduce the level of energy losses of the stored energy during period 56, the vacuum pump 4, may maintain a reduced atmospheric pressure within the containment vessel 46, and the flywheel 7, may have its frictional losses reduced to a minimum by only levitating on the magnetic fields 44.

During the second period of time 56, when the energy is not being transferred into the energy storage device or taken out of the energy storage device efficiency may be optimised if the bearings 27, are not clamping the rotating centre shaft 15, this may be controlled by the computer control means but as previously stated will depend on the stability of the flywheel 7.

Figure 6:
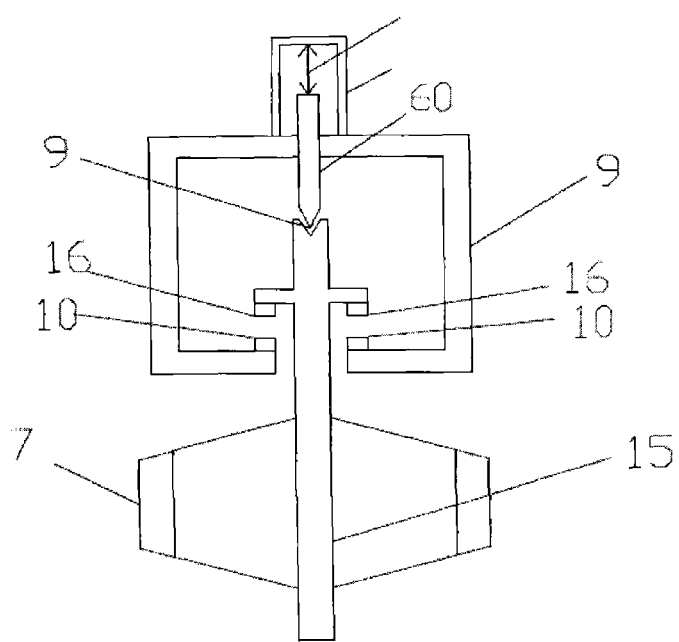
FIG. 6 shows a centralising system in accordance with the present invention.

FIG. 6 shows a flywheel system comprising a flywheel 7, in accordance with the previous embodiments herein described, and a stabilisation system. The stabilisation system comprises lifting means to support the rotating shaft 15, comprising a first toroidal magnet 10. The rotating shaft 15 comprises a second toroidal magnet 16 located coaxially with and above the first magnet 10. The magnets 10 and 16 hold the rotating shaft vertically using their respective magnetic fields. An identical arrangement is provided at the lower end of the rotating shaft 15, thereby establishing a top and bottom pair of stabilisation pins to keep the rotating shaft 15 stable, whilst it rotates.

When the system is rotating, the central processing unit 1 determined the amount of vertical movement required to decrease energy losses in the rotating flywheel due to friction in the bearings. At that time, a stepper motor moves raises the shaft vertically at the top and the top stabilisation pin stays within the recess. At the same time, a stepper motor raises the bottom stabilisation pin accordingly so that the pins remain in place, relative to the rotating shaft 15. The vertical position of the rotating shaft may be adjusted using electromagnets.

A centralising, or stabilising, pin 60 is provided at the top and bottom of the stabilisation system, which locates within a recess at the top end of the shaft 15. Should the shaft 15 deviate from a substantially vertical position, the internal surface of the recess touches the pin 60 and the system corrects itself and returns to a substantially vertical position. The position of the centralising pin 60 is also height-wise adjustable and so can be raised or lowered so that it remains in the same position relative to the rotating shaft 15. It is envisaged that in a less preferable embodiment, the stabilising pin may be provided only at one end of the shaft 15.

The contents of GB1221186.8, filed on 24 Nov. 2012, is hereby incorporated by reference.

The invention claimed is:

1. An energy storage flywheel comprising peripheral receptacles, wherein the mass of the flywheel is adjustable by supplying fluid to the receptacles, wherein the flywheel comprises a fixed central shaft and a rotating shaft coaxial with, and at least partially surrounding, the fixed shaft, the receptacles being connected to the rotating shaft, and wherein the fixed and rotating shafts both comprise magnetic components and the fields created by those magnetic components interact to levitate the rotating shaft with respect to the fixed shaft.

2. An energy storage flywheel according to claim 1, wherein the magnetic components comprise at least one permanent magnet.

3. An energy storage flywheel according to claim 1, wherein the magnetic components comprise at least one electromagnet.

4. An energy storage flywheel according to claim 3, wherein the position to which the rotating shaft is levitated is adjusted by changing the power provided to the electromagnet.

5. An energy storage flywheel according to claim 1, wherein a stabilisation arrangement is provided.

6. An energy storage flywheel according to claim 5, wherein the stabilisation arrangement comprises magnetic components at the top and/or bottom of the rotating shaft.

7. An energy storage flywheel according to claim 5, wherein the stabilisation arrangement comprises a stabilisation pin positioned at the top and/or bottom of the rotating shaft.

8. An energy storage flywheel according to claim 7, wherein the stabilisation pin or pins and be raised and lowered with respect to the fixed shaft so that it stays in position relative to the rotating shaft.

9. An energy storage system comprising a containment vessel in which one or more flywheels in accordance with claim 1 is position.

10. An energy storage system according to claim 9, wherein the containment vessel is at least partially evacuated to remove air from within the system.

11. An energy storage system according to claim 9, wherein the containment vessel is double-skinned.

* * * * *

UNITED STATES PATENT AND TRADEMARK OFFICE
CERTIFICATE OF CORRECTION

PATENT NO.         : 9,945,445 B2
APPLICATION NO.    : 14/646989
DATED              : April 17, 2018
INVENTOR(S)        : Gary Murphy It is certified that error appears in the above-identified patent and that said Letters Patent is hereby corrected as shown below:

Claim 8 starting at Column 12, Line 44 appears as:
"8. An energy storage flywheel according to claim 7, wherein the stabilisation pin or pins and be raised and lowered with respect to the fixed shaft so that it stays in position relative to the rotating shaft."
Should be changed to:
--8. An energy storage flywheel according to claim 7, wherein the stabilisation pin or pins can be raised and lowered with respect to the fixed shaft so that it stays in position relative to the rotating shaft.--

Claim 9 starting at Column 12, Line 48 appears as:
"9. An energy storage system comprising a containment vessel in which one or more flywheels in accordance with claim 1 is position."
Should be changed to:
--9. An energy storage system comprising a containment vessel in which one or more flywheels in accordance with claim 1 is positioned.--

Signed and Sealed this
Twenty-sixth Day of June, 2018

Andrei Iancu
*Director of the United States Patent and Trademark Office*